(12) United States Patent
Maierbacher et al.

(10) Patent No.: US 7,867,097 B2
(45) Date of Patent: Jan. 11, 2011

(54) FLEXIBLE BUSHING SYSTEM

(75) Inventors: Georg Maierbacher, Kirchdorf (DE); Francis Muchingile, Winhöring (DE)

(73) Assignee: SGF Suddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 460 days.

(21) Appl. No.: 11/665,227

(22) PCT Filed: Oct. 19, 2005

(86) PCT No.: PCT/EP2005/011260

§ 371 (c)(1),
(2), (4) Date: Apr. 12, 2007

(87) PCT Pub. No.: WO2006/045516

PCT Pub. Date: May 4, 2006

(65) Prior Publication Data

US 2007/0265101 A1 Nov. 15, 2007

(30) Foreign Application Priority Data

Oct. 22, 2004 (DE) .................. 10 2004 051 566

(51) Int. Cl.
*F16D 3/78* (2006.01)

(52) U.S. Cl. .................. 464/93; 403/221; 29/506

(58) Field of Classification Search .......... 464/92, 464/93, 98, 118, 74, 75, 89–91; 403/220, 403/221; 264/219, 239, 261; 29/506
See application file for complete search history.

(56) References Cited

U.S. PATENT DOCUMENTS

| 1,596,327 | A |   | 8/1926  | Weir et al. |          |
|-----------|---|---|---------|-------------|----------|
| 1,649,426 | A | * | 11/1927 | Van Ranst   | 464/75   |
| 1,780,727 | A | * | 11/1930 | Tenney      |          |
| 2,105,188 | A | * | 1/1938  | Guy         |          |
| 2,159,235 | A |   | 5/1939  | Tyler et al. |         |
| 2,885,870 | A | * | 5/1959  | Jaklitsch   | 464/89   |
| 2,956,187 | A | * | 10/1960 | Wood        | 464/89   |
| 3,076,352 | A | * | 2/1963  | Larsh       |          |

(Continued)

FOREIGN PATENT DOCUMENTS

CH 322136 7/1957

(Continued)

*Primary Examiner*—Greg Binda
(74) *Attorney, Agent, or Firm*—Woodard Emhardt Moriarty McNett & Henry LLP

(57) ABSTRACT

A flexible bushing arrangement (30; 30') has an inner bushing (32; 32'), an outer bushing (34; 34') which surrounds the inner bushing and delimits an annular space (36; 36', 36") therewith, and a resilient connecting body (38; 38) which is arranged in the annular space (36; 36', 36") and connects the two bushings (32, 34; 32', 34') to each other. In end regions of the annular space (36; 36', 36") spacers (40, 42; 40', 42') are arranged which allow only limited radial relative movements of the two bushings (32, 34; 32', 34') in relation to each other. Each of the spacers (40, 42; 40', 42') is constructed in one piece with one of the bushings (32, 34; 32', 34') and is arranged in such a way that it may only act on the other bushing (34, 32; 34', 32') via the connecting body (38, 38'). Each of the spacers (40, 42) is constructed in the manner of a toothed ring.

6 Claims, 3 Drawing Sheets

U.S. PATENT DOCUMENTS

| | | | |
|---|---|---|---|
| 3,673,813 A * | 7/1972 | Wright | 464/90 X |
| 4,012,923 A | 3/1977 | Lundgren | |
| 4,738,650 A | 4/1988 | Hojo et al. | |
| 5,288,059 A | 2/1994 | Gautheron et al. | |
| 6,283,867 B1 | 9/2001 | Aota et al. | |

FOREIGN PATENT DOCUMENTS

| | | |
|---|---|---|
| DE | 38 22 417 A1 | 8/1989 |
| DE | 44 03 465 C1 | 7/1995 |
| GB | 2 060 816 A | 5/1981 |
| JP | 2003-184924 | 7/2003 |

* cited by examiner

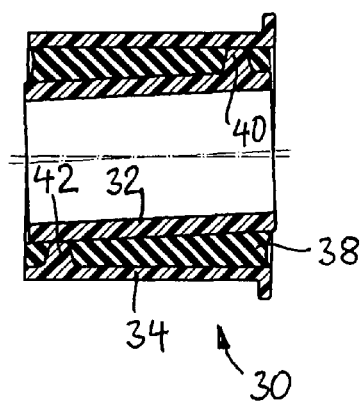
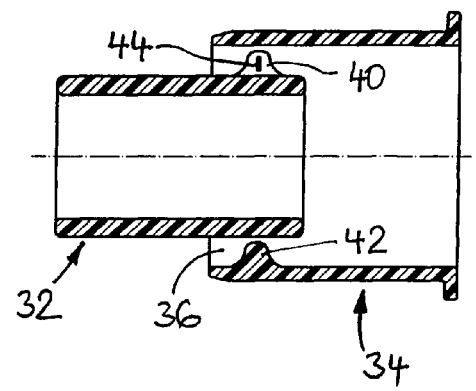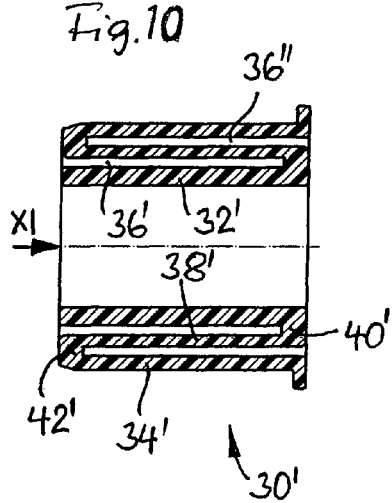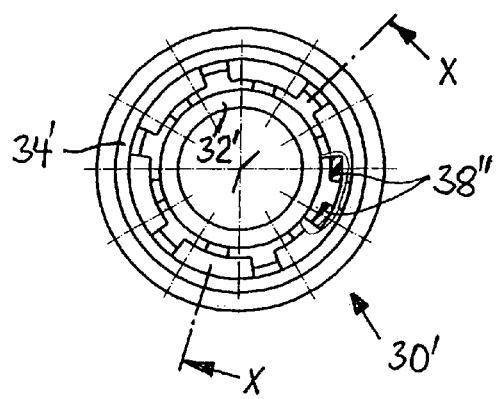

FLEXIBLE BUSHING SYSTEM

CROSS-REFERENCE TO RELATED APPLICATIONS

This application is the U.S. National Stage of International Application No. PCT/EP2005/011260 filed Oct. 19, 2005, which claims priority to DE Application No. 102004051566.2 filed Oct. 22, 2004, both of which are hereby incorporated in their entirety.

BACKGROUND OF THE INVENTION

The invention relates to a resilient bushing arrangement comprising an inner bushing, an outer bushing, which surrounds the inner bushing and delimits an annular space therewith, a resilient connecting body, which is arranged in the annular space and connects the two bushings to each other, and spacers, which are arranged in end regions of the annular space and allow only limited radial relative movements of the two bushings in relation to each other.

A bushing arrangement of this type is known from U.S. Pat. No. 4,738,650 A in which a respective intermediate bushing, as a spacer, is pressed onto both ends of the inner bushing or into both ends of the outer bushing and these intermediate bushings have dimensions such that defined radial play remains between inner and outer bushings. A rubber bushing is vulcanised onto the central region of the inner bushing as a resilient connecting body and this is dimensioned in its axial length such that a space also remains between the rubber bushing and each of the two spacers. The arrangement of inner bushing, spacers and rubber bushing arranged therebetween on the inner bushing is pre-assembled and then pressed into the outer bushing such that the rubber bushing is pre-tensioned. According to U.S. Pat. No. 4,738,650 A flexible bushing arrangements of this type are provided as fastening elements of a resilient flexible disc. During operation this has to transmit torques. In the process the inner bushings of the bushing arrangements are pushed in the direction of the outer bushings, wherein the rubber bushings are pressurised. If the torque to be transmitted by the flexible disc exceeds a specific amount the spacers bridge the gap between the inner bushings and the outer bushings and thereby limit the pressure that acts on the rubber bushings.

BRIEF SUMMARY OF THE INVENTION

The object underlying the invention is to configure a flexible bushing arrangement in such a way that it is easy to produce and forms an effective barrier against the transmission of structure-borne noise with all excursions that occur during operation, even angular excursions, of the inner bushing in relation to the outer bushing.

Starting from a flexible bushing arrangement of the type described in the introduction the object is achieved according to the invention in that each of the spacers is constructed in one piece with one of the bushings and is arranged in such a way that it may act on the other bushing via the connecting body.

The one-piece construction of the spacers with either the inner bushing or the outer bushing simplifies the production of the bushing arrangement according to the invention. As a result of the fact that each of the spacers is arranged in such a way that it may only act on one of the two bushings via the connecting body, direct transmission of vibrations between the bushings via one or more spacers is ruled out. Despite its simplicity the bushing arrangement according to the invention therefore provides particularly good protection against the transmission of structure-borne noise even if the inner bushing and/or the outer bushing are made from steel.

The two bushings—inner bushing and outer bushing—are preferably made from plastics material. Polyphenylene ether (PPE) and polyamide 612 (PA 612) are particularly suitable. Outer bushings made of one of these plastics materials may for example be pressed from rubber in a blank of a flexible disc, while inner bushings made from one of these plastics materials are particularly suitable for receiving threaded bolts made of steel in such a way that they may be alternately fastened without play to one or the other of two shaft flanges, between which the flexible disc is arranged.

The resilient connecting body is preferably made from rubber or rubbery material and the annular space between inner and outer bushings is preferably completely filled by the resilient connecting body and the spacers.

It is particularly advantageous if each of the spacers is formed in the manner of a toothed ring. This provides the possibility of producing positive locking between the spacers and the resilient connecting body, so the flexible bushing arrangement according to the invention is capable inter alia of transmitting torques.

With a given size of the bushing arrangement according to the invention its capacity to transmit torques may be increased further if at least one pair of toothed ring-like spacers, of which one is constructed on the inner bushing and the other on the outer bushing, engage in each other in the manner of a gear coupling and in the process have play in the radial and circumferential directions which is bridged by the resilient connecting body.

Alternatively the two bushings, the spacers and the resilient connecting body may be produced in one piece, wherein an inner spacer is arranged at one end of the inner bushing, an outer spacer is arranged at the opposite end of the outer bushing and the resilient connecting body, connecting these two spacers together, divides the annular space between the two bushings into an inner annular space and an outer annular space.

With this alternative embodiment of the invention the resilient connecting body can be divided in a cage-like manner into axis-parallel bars. The resilient flexibility of the connecting body may be increased thereby.

Bushing arrangements according to the invention are primarily to be provided between two joint parts of a universal joint shaft to reciprocally centre these joint parts and thereby prevent the joint shaft from buckling.

The invention also relates to a method for producing a bushing arrangement according to the invention of the type described in the introduction. The method is conducted according to the invention in such a way that the bushings and the spacers are formed in one piece, wherein an inner spacer arranged close to one end of the inner bushing and an outer spacer arranged close to the opposite end of the outer bushing are directly adjacent to each other and are connected together by a predetermined breaking region, and the inner bushing projects from the outer bushing. The inner bushing is thereafter pushed into the outer bushing, wherein said spacers separate from each other in the predetermined breaking region. The annular space between the bushings is finally filled with a rubbery compound which forms the resilient connecting body.

Embodiments with further details of the invention will be described hereinafter with reference to schematic drawings, in which:

BRIEF DESCRIPTION OF THE DRAWINGS

FIG. 5 shows a longitudinal section, corresponding to FIG. 3, of the same bushing arrangement, but subject to a buckling load, FIG. 6 shows two component parts of the same bushing arrangement according to a first production step, FIG. 10 shows an alternative bushing arrangement, illustrated as a longitudinal section X-X in FIG. 11, and FIG. 11 shows the front view in the direction of arrow XI in FIG. 10.

DETAILED DESCRIPTION OF THE INVENTION

Figure 1:
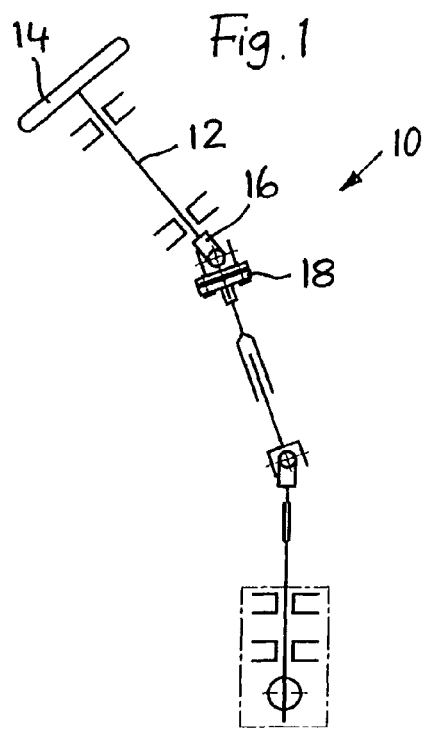
FIG. 1 is a side view of a joint shaft in the steering chain of a motor vehicle, in particular a car.
Figure 2:
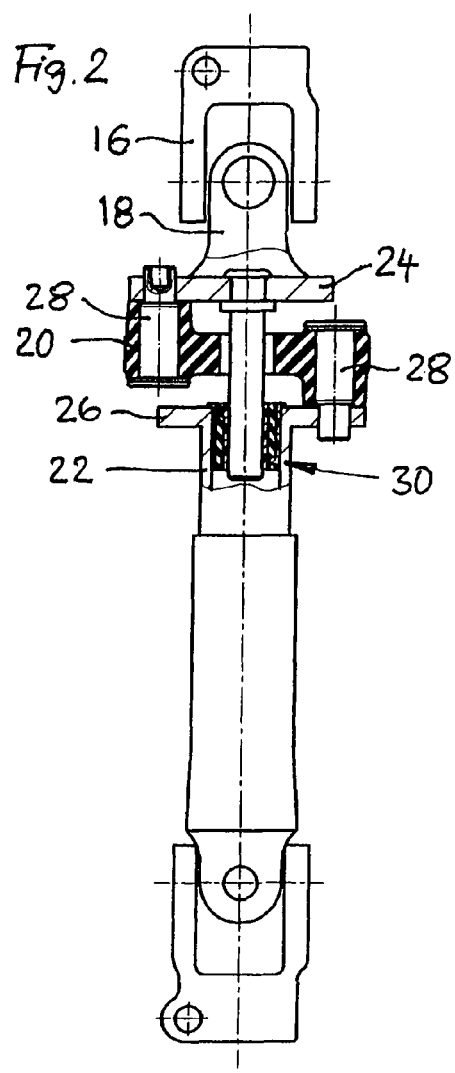
FIG. 2 shows an enlarged view of the joint shaft in FIG. 1, partially illustrated as a longitudinal section.

The joint shaft 10, schematically illustrated in FIG. 1, in the steering chain of a car comprises a steering shaft 12 which issues from a steering wheel 14 and ends at a first joint part 16 of a cross pin joint 16, 18. The second joint part 18 is connected to a third joint part 22 by a resilient flexible disc 20. For this purpose the joint parts 18 and 22 each have a flange 24 or 26. The flexible disc 20 is alternately connected to the flange 24 and the flange 26 by fastening pins 28. The third joint part 22 contains the bushing arrangement 30 shown in more detail in FIGS. 3 and 4. This comprises an inner bushing 32 and an outer bushing 34 which, in the normal state, are arranged coaxial with each other and radially inwardly or outwardly delimit an annular space 36 which contains a bushing-like, resilient connecting body 38.

Figure 3:
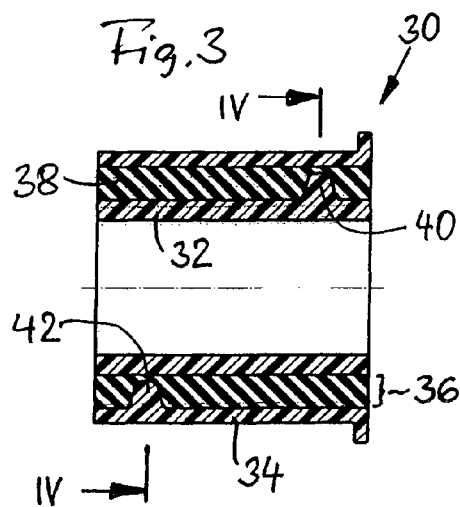
FIG. 3 shows a further enlarged illustration of a flexible bushing arrangement from FIG. 2, illustrated as a longitudinal section III-III in FIG. 4, in the non-loaded state.
Figure 4:
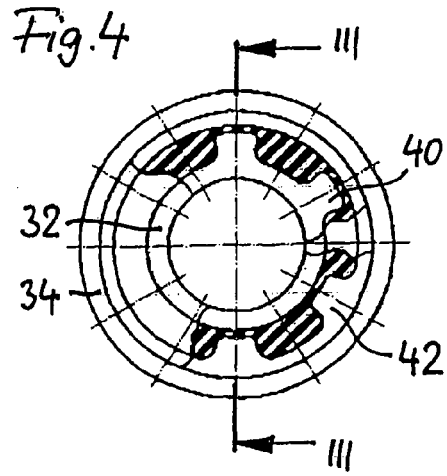
FIG. 4 shows the front view of the bushing arrangement, partially illustrated as a cross-section IV-IV in FIG. 3.

At the, in FIG. 3, right, end region of the inner bushing 32 there is constructed in one piece an inner spacer 40 which in the example illustrated here comprises a ring of radially outwardly projecting teeth. In the same way, at the, in FIG. 3, left, end region of the outer bushing 34 there is constructed in one piece an outer spacer 42 which in the example illustrated here comprises a ring of radially inwardly projecting teeth. The two bushings 32 and 34 and their spacers 40 and 42 are injected from plastics material, for example from PPE or PA 612. The two spacers 40 and 42 are embedded in the resilient connecting body 38, which, according to FIGS. 2 to 5, is made from rubber and together with the spacers 40 and 42 completely fills the annular space 36 between the inner bushing 32 and the outer bushing 34.

The inner bushing 32 and the outer bushing 34 may be produced in a particularly simple manner by, for example, being commonly injected from one of said plastics materials. This takes place in an injection mould which is shaped in such a way that the two bushings 32 and 34 are produced in coaxial arrangement, although axially mutually offset. The axial offset is chosen such that the toothed wheel which forms the one-piece spacer 40 with the inner bushing 32 is located in a common axis-normal plane with the toothed wheel which forms the one-piece spacer 42 with the outer bushing 34, and these two toothed wheels engage with each other tooth on pawl. At least a few teeth of the inner spacer 40 are connected to adjacent teeth of the outer spacer 42 by a predetermined breaking region 44 in the process. The two bushings 32 and 34, after they have been commonly injected, therefore first of all form a unit.

Figure 7:
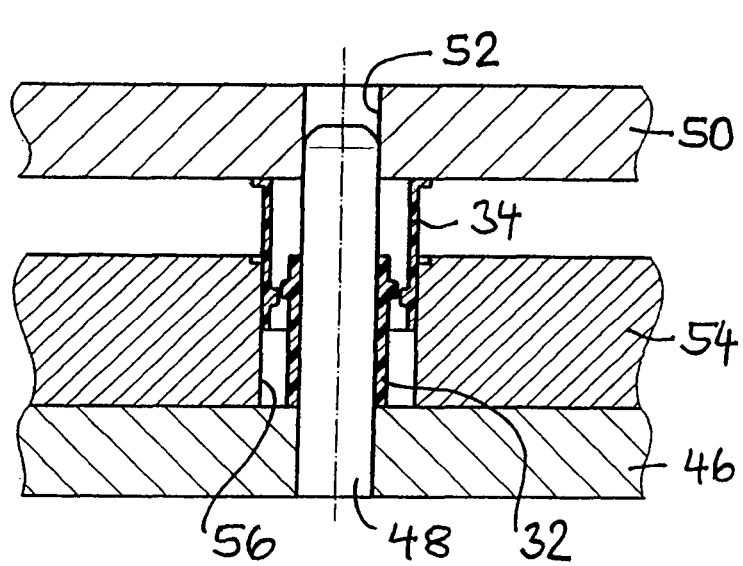
FIGS. 7 to 9 show further production steps of the bushing arrangement.

FIG. 7 shows a vulcanising tool which comprises a base plate 46 with centring mandrel 48 fastened thereto, and a top plate 50 with a receiving hole 52 for the centring mandrel 48 and a heating plate 54 with receiving hole 56 for the outer bushing 34. The unit comprising inner bushing 32 and outer bushing 34 is inserted into this vulcanising tool in such a way that the inner bushing 32 is pushed onto the centring mandrel 48 until it touches the base plate 46 with its lower end side. The outer bushing 34 is partially inserted into the receiving hole 56 of the heat plate 54 in the process. Meanwhile the top plate 50 is kept ready separately, for example at a greater height distance from the remaining tool parts than shown in FIG. 7.

Figure 8:
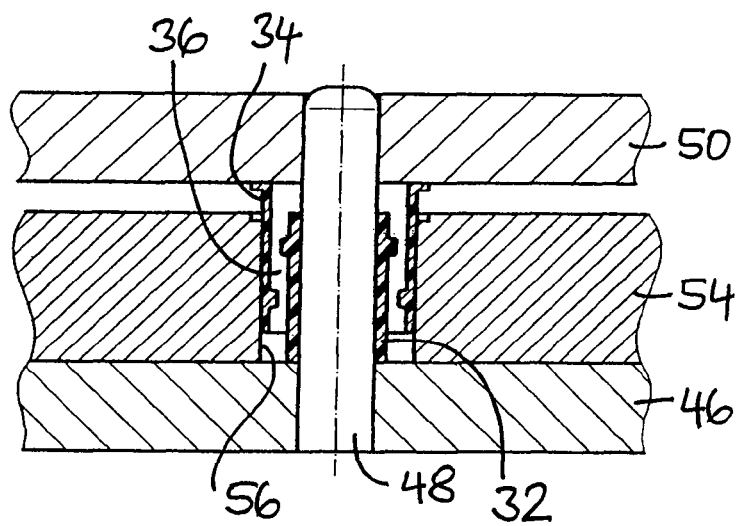
Figure 9:
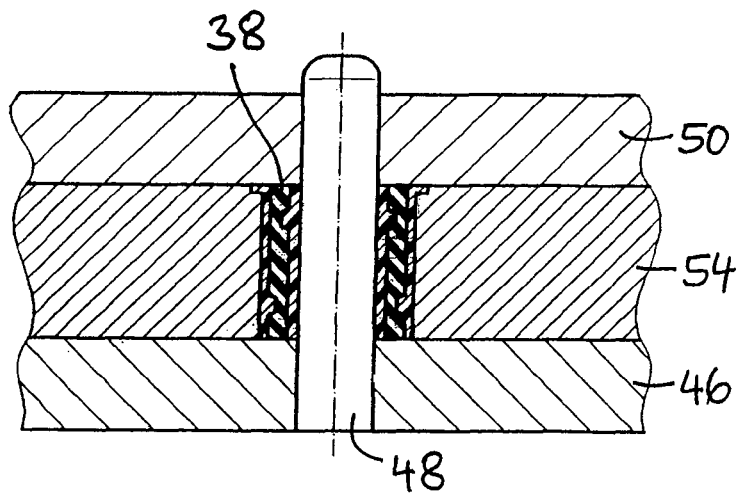

As soon as the unit comprising inner bushing 32 and 34 has been inserted in the described manner, the top plate 50 is lowered, wherein it is centred in relation to the base plate 46 and the heating plate 54 fastened thereto by the penetration of the centring mandrel 48 into the associated receiving hole 52, as shown in FIG. 7. If the top plate 50 is lowered further the outer bushing 34 is pushed further into the receiving hole 56 of the heating plate 54 according to FIG. 8. The unit previously formed by the two bushings 32 and 34 breaks in the process at the predetermined breaking regions 44. However the vulcanising tool accordingly ensures that the two bushings remain centred in relation to each other. According to FIG. 9 the top plate 50 finally abuts the heating plate 54 in a sealing manner and at the same time the outer bushing 34 arrives in its final position in which its lower end face, like that of the inner bushing 32, rests on the base plate 46. The annular space 36 between the two bushings 32 and 34 is now completely filled with an injected rubber mixture which forms the resilient connecting body 38. After vulcanising this rubber mixture the bushing arrangement 30 is complete.

FIGS. 10 and 11 show a further embodiment, wherein components which correspond in terms of their function to previously described components are designated by the previously used reference numerals, albeit with additional index lines. The bushing arrangement shown in FIGS. 10 and 11 is accordingly designated as a whole by 30', its inner bushing by 32', its outer bushing by 34', etc. According to FIG. 10 the inner bushing 32' is integrally connected in its, in FIG. 10, right, end region, via its—in this case, single—spacer 40' to an intermediate bushing which is coaxially arranged with the inner bushing 32' and the outer bushing 34' and forms the resilient connecting body 38'. The connecting body is integrally connected in the left end region of the bushing arrangement 30' to the outer bushing 34' via the—in this case, single—spacer 42'. There is no predetermined breaking region in this embodiment. Said components of the bushing arrangement 30' are constantly connected to each other. The resilient connecting body 38' divides the annular space between inner bushing 32' and outer bushing 34' into an inner annular space 36' and an outer annular space 36" which are cavities in the illustrated example, but may, if desired, also be filled with rubber. The, in principle, bushing-like resilient connecting body 38' can be divided in a cage-like manner into a number of axis-parallel bars 38"', as indicated in FIG. 11, to increase its resilient flexibility.

The invention claimed is:

1. Flexible bushing arrangement to provide a barrier against the transmission of structure-borne noise between an inner joint member and an outer joint member of a universal joint comprising;
   a one piece inner bushing to surround an inner joint member of a universal joint while not being connected thereto,
   an outer bushing which surrounds the inner bushing about a longitudinal axis of rotation and delimits an annular space therewith extending the length thereof, said outer bushing locatable within an outer joint member while not being connected thereto with said outer bushing and said inner bushing having spaced apart but side by side first ends and spaced apart but side by side opposite second ends with said annular space extending from between said first ends lengthwise through said outer bushing to said second ends,
   a resilient connecting body, which is arranged in the annular space and connects the two bushings to each other, said resilient body extends from between said first ends lengthwise through said outer bushing to between said second ends, said outer bushing, said resilient body and said inner bushing being arranged coaxially with each other on said axis while said inner joint member is in line adjacent said first ends and said outer joint member is in line adjacent said second ends on said axis, and
   spacers which are arranged in the end regions of the annular space and allow only limited radial relative movements to the bushings in relation to each other, wherein each of the spacers is constructed in one piece with one of the bushings and arranged in such a way that it may only act on the other bushing via the connecting body,
   each of the spacers is constructed in the manner of a toothed ring wherein at an end region of the inner bushing there is provided at least one inner spacer and at an end region being arranged opposite to the end region of the inner bushing there is provided at least one outer spacer,
   said at least one inner spacer being integral with said inner bushing and projecting radially outwardly into said resilient connecting body and toward said outer bushing,
   said at least one outer spacer being integral with said outer bushing and projecting radially inwardly into said resilient connecting body and toward said inner bushing, and,
   said inner bushing, outer bushing and resilient connecting body being arranged for reciprocal centering of said inner bushing and outer bushing isolating structure-borne noise between the inner joint member and the outer joint member of a universal joint by allowing limited movement between said inner bushing and said outer bushing and said reciprocal centering by said inner bushing while said outer bushing and said resilient connecting body and said inner bushing rotate about said longitudinal axis.

2. Bushing arrangement according to claim 1 wherein the resilient connecting body is made from rubbery material and the annular space is completely filled by the resilient connecting body and the spacers.

3. The flexible bushing arrangement of claim 1 wherein:
   said inner joint member extends freely into said inner bushing and said outer bushing extends freely into said outer joint member.

4. A flexible bushing arrangement comprising;
   an inner joint member and an outer joint member of a universal joint,
   an inner bushing surrounding said inner joint member while not being connected thereto,
   an intermediate bushing surrounding said inner bushing, being integral therewith and forming a first annular space therebetween,
   an outer bushing surrounding said intermediate bushing and being integral therewith about a longitudinal axis of rotation and forms a second annular space therebetween extending the length thereof, said outer bushing being positioned within said outer joint member while not being connected thereto,
   a resilient connecting body, which is arranged in the first and second annular space and connects the inner, intermediate and outer bushings to each other, and
   spacers which are arranged in the end regions of the first and second annular space and allow only limited radial relative movements to the bushings in relation to each other, wherein the spacers are constructed in one piece and integral with the inner, intermediate and outer bushings,
   each of the spacers is constructed in the manner of a toothed ring wherein at an end region of the inner bushing there is provided at least one inner spacer and at an end region being arranged opposite to the end region of the inner bushing there is provided at least one outer spacer, said at least one inner spacer and said at least one outer spacer being arranged with an axial space therebetween,
   said at least one inner spacer being integral with said inner bushing and said outer bushing and projecting radially outwardly from said inner bushing toward said outer bushing,
   said at least one outer spacer being integral with said outer bushing and said inner bushing and projecting radially inwardly from said outer bushing toward said inner bushing, and,
   said inner bushing, intermediate bushing and outer bushing and resilient connecting body being arranged for reciprocal centering of said inner bushing and outer bushing while not being connected to said outer joint member and said inner joint member isolating structure-borne noise between the inner joint member and the outer joint member by allowing limited movement between said inner bushing and said outer bushing and said reciprocal centering by said inner bushing while said outer bushing and said resilient connecting body and said inner bushing rotate about said longitudinal axis.

5. The one piece flexible bushing arrangement, of claim 4 wherein:
   said inner joint member extends freely into said inner bushing and said outer joint bushing extends freely into said outer member.

6. Method for producing a bushing arrangement comprising the steps of:
   providing an inner bushing, an outer bushing which surrounds the inner bushing and delimits an annular space therewith, a resilient connecting body, which is arranged in the annular space and connects the two bushings to each other, and spacers which are arranged in the end regions of the annular space and allow only limited radial relative movements to the bushings in relation to each other, wherein each of the spacers is constructed in one piece with one of the bushings and is arranged in such a way that it may only act on the other bushing via the connecting body, and, wherein each of the spacers is constructed in the manner of a toothed ring wherein at an end region of the inner bushing there is provided at least one inner spacer and at an end region being arranged opposite to the end region of the inner bushing there is provided at least one outer spacer, and, the bushings and the spacers are formed in one piece, wherein an inner spacer arranged close to one end of the inner bushing and an outer spacer arranged close to the opposite end of the outer bushing are directly adjacent to each other and are connected together by a predetermined breaking region, and the inner bushing projects from the outer bushing, the inner bushing is thereafter pushed into the outer bushing, wherein said spacers separate from each other in the predetermined breaking region, and the annular space between the bushings is finally filled with a rubbery compound which forms the resilient connecting body.

* * * * *